United States Patent
Chess et al.

(10) Patent No.: US 7,249,128 B2
(45) Date of Patent: Jul. 24, 2007

(54) PERFORMANCE PREDICTION SYSTEM WITH QUERY MINING

(75) Inventors: David M. Chess, Mohegan Lake, NY (US); Sophia Krasikov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/635,728

(22) Filed: Aug. 5, 2003

(65) Prior Publication Data

US 2005/0033734 A1 Feb. 10, 2005

(51) Int. Cl.
G06F 17/30 (2006.01)
(52) U.S. Cl. .......................................... 707/5; 707/100
(58) Field of Classification Search ................ 707/3–5, 707/100
See application file for complete search history.

(56) References Cited

U.S. PATENT DOCUMENTS

| | | | |
|---|---|---|---|
| 6,026,391 A * | 2/2000 | Osborn et al. ................. 707/2 |
| 6,182,060 B1 * | 1/2001 | Hedgcock et al. ............. 707/1 |
| 6,847,938 B1 * | 1/2005 | Moore .......................... 705/26 |
| 2002/0059258 A1 * | 5/2002 | Kirkpatrick ................. 707/100 |
| 2002/0107853 A1 | 8/2002 | Hofmann et al. .............. 707/7 |

OTHER PUBLICATIONS

Ozmutlu, H.C., et al., "Analysis of Large Data Logs: an Application of Poisson Sampling on Excite Web Queries", 2002, Information Processing and Management 38 (2002) pp. 473-490.
Zhang, D., et al., "A Novel Web Usage Mining Approach for Search Engines", Computer Networks 39 (2002), pp. 303-310.
He, D., et al., "Combining Evidence for Automatic Web Session Identification", Information Processing and Management 38 (2002), pp. 727-742.

* cited by examiner

Primary Examiner—Cheryl Lewis
(74) Attorney, Agent, or Firm—Harrington & Smith, PC

(57) ABSTRACT

Disclosed is a performance prediction system and service that uses acquired knowledge of queries that are received to make predictions concerning the future performance of certain entities, such as business entities. By analyzing query patterns and the actual or predicted performance of business entities, the performance prediction service is enabled to observe correlations between queries, query patterns and performance that can be used to facilitate the prediction of future performance.

33 Claims, 3 Drawing Sheets

PERFORMANCE PREDICTION SYSTEM WITH QUERY MINING

TECHNICAL FIELD OF THE INVENTION

This invention relates to a system, method and service that collects and stores information regarding queries received by a performance prediction system, and that enables the stored information to be queried to provide enhanced performance prediction results to a user.

BACKGROUND OF THE INVENTION

Reputation and performance prediction systems are known and increasingly relied upon for providing valuable information. Examples include the Better Business Bureau, and Internet applications such as online auction and other types of user rating systems. Typically, these systems are intended to provide users with information about the reputation of businesses and/or the likely success of a transaction. To use these systems, a user typically requests pertinent information. In online embodiments, requests are typically submitted by sending queries of various kinds to the system, and receiving appropriate responses.

If any information relating to the queries is retained, it is most likely used only in a limited fashion, such as for internal record-keeping and load-analysis purposes.

What is needed is an improved performance prediction system that makes use of the received queries for providing additional and enhanced information to interested parties.

SUMMARY OF THE INVENTION

The foregoing and other problems are overcome by methods and apparatus in accordance with embodiments of this invention.

The inventors have recognized that valuable information can be learned from the queries received by a performance prediction system. The information can prove useful to businesses and other interested parties for gaining insight into the needs, interests and/or perspectives of system users. Information on trends and assorted other information may be produced as well from the query record. Examples of useful information include assessing the popularity of a product or service, and assessing the concerns of a typical customer.

Disclosed herein are methods and apparatus for a performance prediction system and service. A typical user of the system disclosed herein may be a business, such as a manufacturer of goods for retail distribution. However, the class of potential users is not restricted to business entities, as other types of organizations and individuals may benefit from the use of this invention.

Aspects of the teachings herein include a system for producing enhanced performance prediction information. The system includes a source of data that contains performance prediction data, where the data source is coupled to a query component adapted for execution of at least one query. Also provided is a data gathering component adapted for collecting query-relevant data concerning received queries and for storing the query-relevant data in a submitted query database. Also included is a meta-query component that is coupled to the submitted query database and that is adapted for querying the query-relevant data and for producing enhanced performance prediction information.

In a further aspect of this invention, a performance prediction service uses acquired knowledge of the queries that are received to make predictions concerning the future performance of certain entities, such as business entities. By analyzing query patterns and the actual or predicted performance of business entities, the performance prediction service is enabled to observe correlations between queries, query patterns and performance that may be used to facilitate the prediction of future performance.

Another aspect of the teachings herein includes a method for producing enhanced performance prediction information, by: querying a source of performance prediction data; collecting query-relevant data about each query; storing the query-relevant data; and, querying the query-relevant data for producing the enhanced performance prediction information.

This invention also provides a computer program product stored on a computer readable media, for implementing a method to receive queries of performance prediction information, store query-relevant data derived from the queries, receive further queries directed to the query-relevant data, and provide the query-relevant data, and/or information derived from the query-relevant data, as enhanced performance prediction information.

In a further aspect, this invention provides a service that is accessible over a data communications network, such as the Internet. The service is operable for receiving queries from users that are related to the performance of some entity, for storing query-relevant data derived from the queries, for receiving queries that are related to the stored query-relevant data, and for providing results for the queries of query-relevant data as enhanced performance prediction information to the users over the data communications network, or via some other means.

Another aspect of this invention includes a communications device for receiving enhanced performance prediction information from a service, where the device includes a communications interface adapted for at least one of submitting a meta-query to the service and receiving the enhanced performance prediction information in response to a meta-query. In the preferred embodiment the service includes a source of data that includes performance prediction data, the data source being coupled to a query component adapted for receiving the meta-query and executing the meta-query; a data gathering component adapted for collecting query-relevant data for fulfilling meta-queries, and storing the query-relevant data in a submitted query database; and a meta-query component coupled to the submitted query database adapted for querying the query-relevant data to produce the enhanced performance prediction information in response to the reception of the meta-query from the communications device.

The various embodiments of the invention described herein are illustrative only, and are not to be considered as limiting the scope or application of this invention.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Disclosed herein are methods and apparatus for an enhanced performance prediction data service. An "enhanced performance prediction data service," as used herein, refers to a service for providing a user, such as an individual or an organization, with information concerning queries received by the performance prediction data service. An organization may be a for-profit or a not-for-profit organization, including government organizations. The performance prediction data service may be used by third parties, or it may be a "captive" service that is operated and used by a single individual or organization.

"Performance prediction data" generally refers to data relevant to the operation of businesses and other organizations that is typically maintained in a database and made available to users through operation of one or more queries. Performance prediction data is so named as it is typically useful as an aid in predicting the reliability, performance, or some such aspect of a business or other organization. For the purposes of this invention "enhanced performance prediction data" generally refers to information that includes at least one component part that is derived from information descriptive of received queries for performance prediction data. Enhanced performance prediction data is so named as it is typically useful for providing insight not available in the performance prediction data, or for serving as an enhancement to the performance prediction data. Both performance prediction data and enhanced performance prediction data are generated and returned to a user in response to queries, which are referred to herein, for convenience only, as one of a "performance query" and a "meta-query."

In general terms, a performance query is directed to obtaining the performance prediction data, while a meta-query is directed to obtaining the enhanced performance prediction data. The performance prediction data is generated by querying a data source, such as a database of product information. The enhanced performance prediction information is derived from a stored historical record of previously received queries. The foregoing definitions are not to be construed as being limitations on the practice of this invention, and are provided simply for the sake of clarity and convenience.

Figure 1:
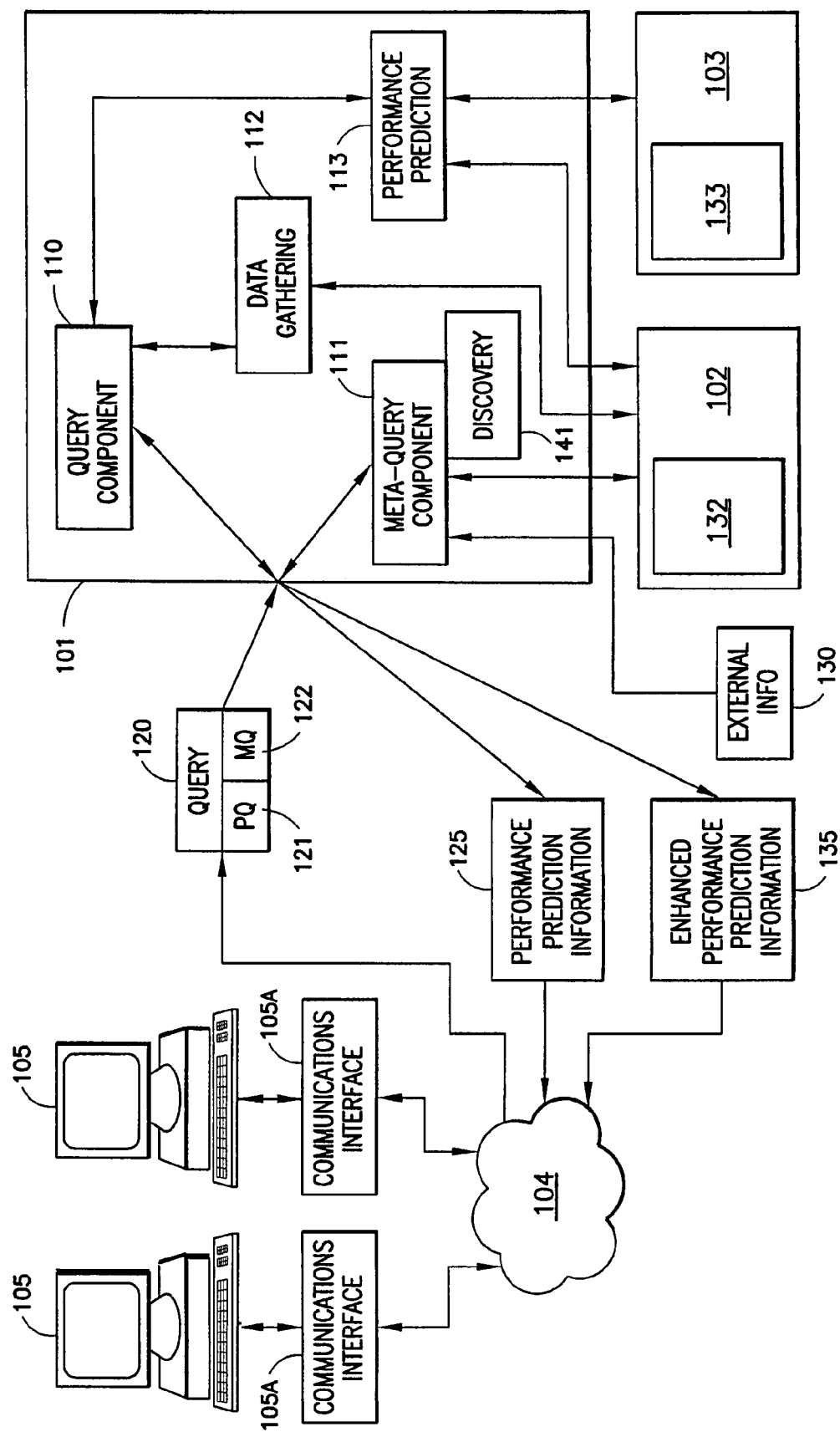
FIG. 1 is a block diagram that depicts components of a performance prediction service.

FIG. 1 illustrates one embodiment of a data processing system for implementing a performance prediction system 101. In this embodiment, the system 101 communicates with a communications device 105 through a network 104, such as the global Internet. Although illustrated as a PC terminal, the communications device 105 may include any type of device, including both mobile and fixed communications devices, capable of generating queries and/or meta-queries, and of receiving query and meta-query results from the system 101. The communications device 105 is assumed to include a suitably programmed communications interface 105A adapted for at least one of submitting a query, such as a meta-query, to the performance prediction system 101 and for receiving performance prediction and enhanced performance prediction information from the performance prediction system 101.

During operation of the system 101, a user of the communications device 105 submits, via communications interface 105A, a query 120 to the system 101, seeking one of performance prediction information 125 or enhanced performance prediction information 135. In this embodiment, where the user is seeking performance prediction information 125, the query 120 is referred to as a performance query (PQ) 121. If the user is seeking enhanced performance prediction information 135, the query 120 is referred to as a meta-query (MQ) 122. The system 101 determines the type of query 120, and directs processing of the query 120 accordingly.

The system 101 further includes a query component 110, a data gathering component 112 and a performance prediction component 113. The data gathering component 112 is bidirectionally coupled to the query component 110 and to a submitted query database 102, containing submitted query-related data 132. The performance prediction component 113 is bidirectionally coupled to the query component 110, to the submitted query database 102, and to a database of performance prediction information 103, containing performance prediction data 133.

In the instance where the query 120 is the performance query 121, the query is routed to the query component 110 for execution. The query component 110 operates with the data gathering component 112 and with the performance prediction component 113. The data gathering component 112 gathers query-relevant information 132 about submitted performance queries 121, and records the query-relevant information 132 in the submitted query database 102. The performance prediction component 113 obtains data 132, 133 from the submitted query database 102 and the database of performance prediction information 103, respectively, as necessary to satisfy the performance query 121. The performance prediction component 113 may employ any suitable techniques for analyzing the data 132, 133, such as statistical techniques, to obtain query patterns and correlations between query patterns. The performance prediction component 113 derives at least one of an actual or predicted performance of an entity of interest (such as a business or an individual), and may consider the correlations between queries, query patterns and performance to facilitate the prediction of future performance of the entity of interest. Results are returned to the query component 110 for routing to the communications device 105 as performance prediction information 125.

The meta-query component 111 provides for the submission of a second type of query 120, the meta-query 122, to request the enhanced performance prediction information 135. The enhanced performance prediction information 135 is produced by querying query-relevant data 132 stored in the submitted query database 102. Query-relevant data 132 may include a variety of data types, such as copies and/or numbers of individual received queries 120, aggregations of query-related information (e.g., times and locations from which queries are received), and also the results of statistical analyses of queries 120. The query-relevant data 132 may further include external information 130, such as, in non-limiting examples, temporal information describing the date or time of query reception, and user location(s) and user-related identifying information (e.g., TCP/IP address). Combinations of such data may be provided as is determined suitable. Results are returned to the meta-query component 111 for routing to the communications device 105 as the enhanced performance prediction data 135.

The performance prediction information 125 and the enhanced performance prediction information 135 are typically routed to the communication device 105 submitting the query 120, however, this is not required and the results may be directed elsewhere.

An aspect of the invention comprises a performance prediction service accessible by a user over a data communications network, said service comprising a programmed data processor for using acquired knowledge of previously submitted queries when making predictions concerning the future performance of the entity of interest.

Another aspect of the invention comprises a computer program product stored on a computer readable media for directing operations of a data processor to execute a method to receive submitted queries for performance prediction information; to collect query-relevant data from the submitted queries; to store the query-relevant data; and to use at least some of the query-relevant data to provide enhanced performance prediction information.

As an example of performance prediction data 133 and query-relevant data 132, one embodiment involves the non-limiting context of a manufacturer and/or distributor of retail goods. In this context, the user may request performance prediction information 125 such as the price of a certain item from a plurality of suppliers, an identification of competitive items, information related to durability and reliability, information related to complaints received from other users about the goods and/or the supplier of the goods, and other similar types of information. Another user may consider it important to obtain enhanced performance prediction information 135, in order to gain insight into market trends in the interests of consumers, features that are of importance to consumers, the perception of the supplier in the eyes of consumers, and other similar types of information. The enhanced performance prediction information preferably includes an information component that is derived from the submitted query database 102 that contains the submitted query-related data 132.

Figure 2:
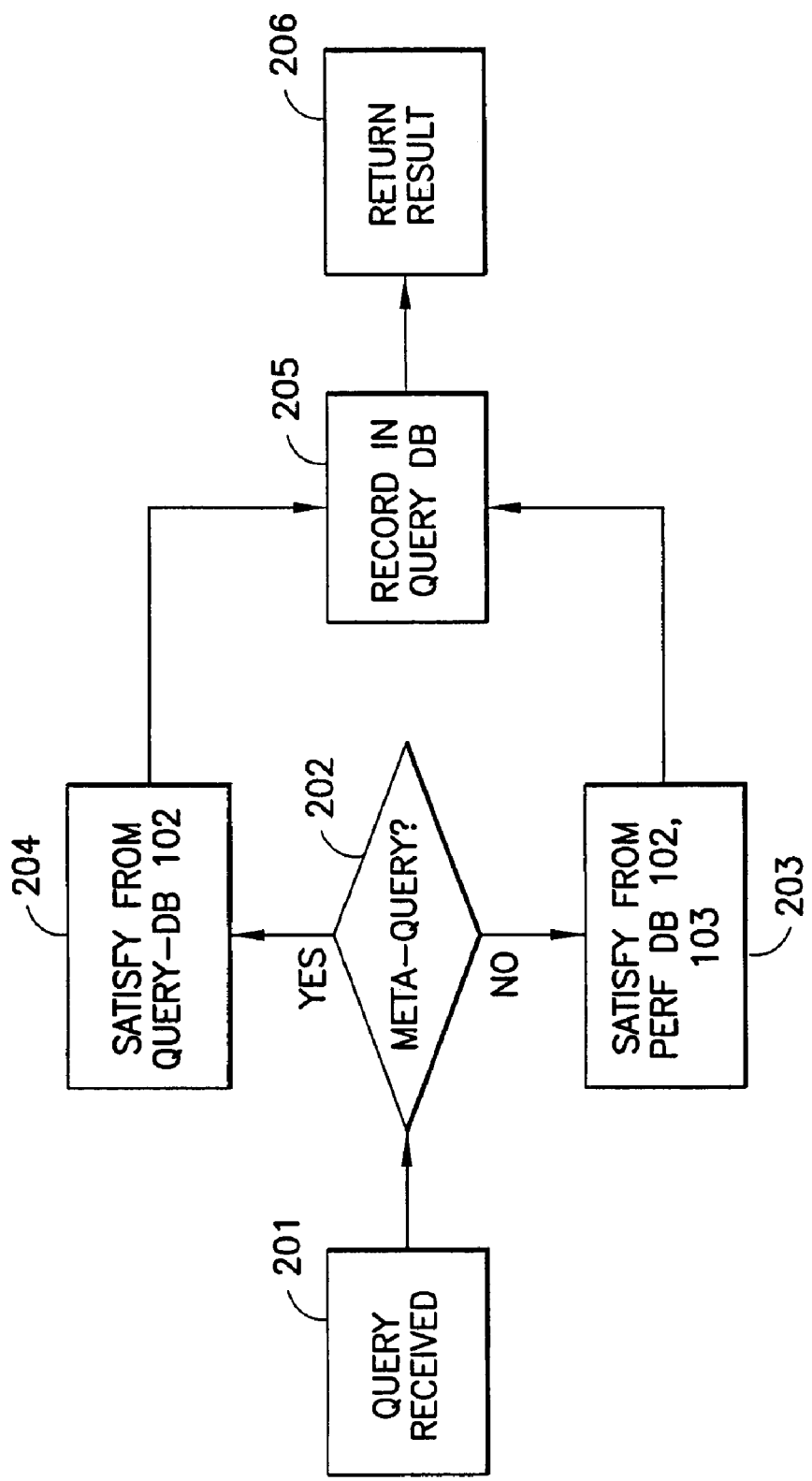
FIG. 2 is a flow chart illustrating operation of the performance prediction service for providing a customer with performance prediction data.

FIG. 2 is a logical flow diagram illustrating an aspect of the operation of the performance prediction system 101. When a query 120 is communicated to the system 101, it is received in step 201. The system 101 examines the query 120 and determines at step 202 the type of query. That is, whether the query 120 is a performance query 121 or a meta-query 122. If the received query 120 is a meta-query 122, then the query is sent to the meta-query component 111 for execution, otherwise it is sent to the query component 110. At step 203 the query component 110 makes use of the submitted query database 102 and the database of performance prediction information 103, as necessary to satisfy the performance query 121. At step 204 the meta-query component 111 executes the meta-query 122 by reference to the submitted query database 102.

In the preferred embodiment information about the received query 120 is also recorded at step 205 in the submitted query database 102, regardless of the type of query 120, and query results are returned at step 206. It should be recognized that at least some of the operations shown in FIG. 2 may be rearranged, such as by executing step 205 prior to step 202, or after step 206.

Figure 3:
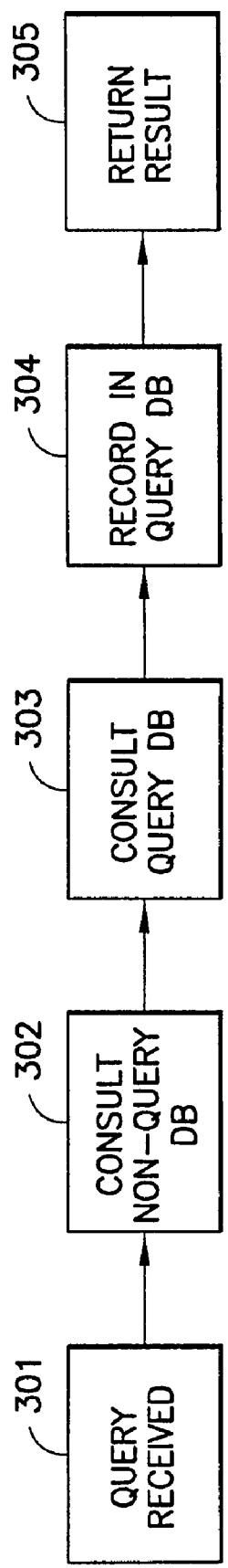
FIG. 3 is a flow chart illustrating operation of the performance prediction service for storing performance prediction data.

FIG. 3 is a logical flow diagram illustrating operation of a presently preferred embodiment of the system 101. In step 301, a performance query 121 is received by the query component 110. The performance query 121 is satisfied in a two step process. First, the database of performance relevant information 103 is interrogated at step 302, then the submitted query database 102 is interrogated at step 303. At step 304 the performance query 121 is recorded in the submitted query database 102. The result that is returned to the user in step 305 is, at least potentially, the result of considering information derived from previous queries 120, which has been recorded in the submitted query database 102. As was described with respect to FIG. 2, some of the steps may be rearranged, such as by executing step 304 prior to step 302, or after step 205, or by executing step 303 prior to step 302.

Another example of performance prediction data 133 and query-relevant data 132 involves the non-limiting context of a rating system. For example, in some on-line systems buyers and sellers can purchase goods or services, or can exchange goods or services, and can also rate various aspects of transactions. For example a potential buyer sends a performance query 121 to ascertain performance prediction information related to a potential seller. The returned information may include information related to the seller's reputation in previous transactions, customer satisfaction survey information, and other such data. The buyer or the seller using the system 101 may issue a meta-query 122 to ascertain enhanced performance prediction information. The enhanced information includes, for example, information descriptive of queries 120 received from previous potential buyers concerning the seller, queries received that included only the seller in the results, queries received that excluded the seller from the results, the number of queries received about the seller, copies of received queries, copies of results returned in response to received queries, how many queries were received during some prescribed period of time; patterns of queries received (e.g., queries received from specific locations, or from specific users), and correlations between queries.

The system 101 supports techniques for producing enhanced performance prediction information 135 that includes at least one of: filtering query-relevant data 132, aggregation of query-relevant data 132, statistical analysis of query-relevant data 132, and a search of query-relevant data 132 for locating information stored for a single query 121 (or for multiple queries 120). Accordingly, the examples herein are merely exemplary and not limiting of reporting results.

Additional examples include embodiments where the results 125, 135 are filtered, or edited, so as to remove sensitive information, such as personal identification information. Filtering may occur at any stage, as appropriate. For example, the filtering may occur by foregoing the storage of certain data, by generally excluding an ability to query for certain data, or by excluding certain data when generating the query report. In other embodiments, the information 125, 135 is not filtered.

The system 101 may include a discovery function 141 that enables users to obtain a list of companies that meet certain criteria.

In a preferred embodiment the system 101 determines the identity and/or address of the user sending the query 120, and establishes whether that user is authorized to access the system 101, and/or arranges to charge the user for the service provided.

Further examples of producing enhanced performance prediction information 135 include analysis of query-relevant data 132 to produce, as examples only, information that is descriptive or indicative of: the number of received queries that are about a specific user (possibly during some prescribed period of time); about a specific product; queries that include or exclude an item of interest (such as an identity of a business or a competitor of the business); queries that are indicative of trends; a most often asked question received in queries; queries that are about reliability (product and/or business); queries related to estimations of a success or failure of a transaction; and an average, a minimum, a maximum, and/or a count of queries containing a single (or multiple) specific subject(s).

In additional embodiments of this invention, the meta-query component 111 allows users to register to be notified when certain information 132 comes to exist in the submitted query database 102. For instance, a user might register to receive notification whenever some predetermined criteria has been reached, such as when a some number of queries 120 about the user have been recorded in the database 102, or when any query is received about the user, or when some number of queries concerning a competitor have been recorded. A business user may also be interested in being informed whenever a query is received about a certain product that indicates that the buyer of the product may require service or repair of the product (e.g., a query is received from buyer requesting information about the availability of service or parts suppliers.

In another embodiment, a user might register to automatically initiate a meta-query 122 at a specified time. In this case the meta-query may be already stored in the system 101, and is activated at the appropriate time.

As can be appreciated, in one aspect this invention enables the performance prediction system 101 to examine and analyze the submitted query database 102 that contains the submitted query-related data 132. This can be seen to provide an ability to perform "data mining" on the submitted query-related data 132, or more generally to permit a "query mining" operation to be performed.

One skilled in the art should recognize that the invention is not limited to a performance prediction data system 101, as disclosed herein, and that the teachings herein may be employed in a variety of embodiments. For example, a business may integrate the teachings herein with internal information systems, and therefore not deal with a service provider 101. The teachings herein may be used as a part of a predictive maintenance information system, where maintenance planning or an engineering staff monitors access to information by maintenance personnel. The teachings herein may be implemented without a network 104 in a standalone system. Accordingly, it is considered that these and other additional embodiments are within the teachings of this invention, as defined by the appended claims.

What is claimed is:

1. A performance prediction system, comprising:
at least one memory to store a plurality of computer program components, the computer program components further comprising:
a query component for receiving performance queries submitted by users for data relevant to the probability that transactions with entities of interest will be successful;
a data gathering component for deriving query-relevant data from the submitted performance queries, where at least part of the query-relevant data is derived from information reflected in the performance queries, and for storing the query-relevant data;
a query fulfillment component for providing data relevant to the probability that transactions with entities of interest will be successful to the users submitting performance queries, the data provided by the query fulfillment component to users through a communications interface; and
a meta-query component for receiving meta-queries from users,
wherein the meta-queries seek enhanced performance prediction information, for querying the stored query-relevant data to gather the enhanced performance prediction information, and for providing the enhanced performance prediction information through a communications interface to users submitting the meta-queries; and
at least one data processor to execute the computer program components.

2. A system as in claim 1, where the plurality of computer program components further comprises a performance-prediction component that uses data comprising the stored submitted query data in making estimations relevant to the likelihood of success of a transaction involving the entities of interest.

3. A system as in claim 2, where the performance prediction component determines statistical correlations between patterns of submitted queries when executed.

4. A system as in claim 3, where the performance prediction component when executed uses one of actual and predicted performance of entities, and uses statistical correlations to predict likely future performance based on past and present query data.

5. A system as in claim 1, where the meta-query component returns copies of submitted queries when executed.

6. A system as in claim 1, where the meta-query component returns edited copies of submitted queries when executed.

7. A system as in claim 1, where the meta-query component returns an indication of a number of queries that have been submitted to the system during a particular time period when executed.

8. A system as in claim 1, where the meta-query component when executed allows a user to register to be notified at some future time of submitted queries that are received about that user.

9. A system as in claim 1, where the meta-query component when executed allows a user to register to be notified whenever a specified number of queries about that user have been submitted to the system.

10. A system as in claim 1, where the query component when executed also comprises a discovery component that allows users to receive a list of entities that satisfy certain criteria.

11. A system as in claim 1, where the meta-query component when executed allows a business to obtain information about queries submitted to the system during a particular time period, and which returned a list of companies that include that business.

12. A system as in claim 1, where the meta-query component when executed allows a business to obtain information about queries submitted to the system during a particular time period, and which returned a list of companies that did not include that business.

13. A performance prediction service accessible by a user over a data communications network, said service comprising:
a computer readable storage device, the computer readable storage device storing a computer readable program, wherein when the computer readable program is executed by a data processor operations are performed, the operations comprising:
using knowledge acquired in responding to previously submitted performance queries which sought data relevant to the probability that a transaction with an entity of interest would be successful when making predictions concerning the future performance of the entity of interest;
saving the predictions; and
providing the predictions to users submitting later meta-queries, the predictions provided through a communications interface; and
a data processor to execute the computer program.

14. A performance prediction service as in claim 13, where said computer program further analyzes query patterns and at least one of an actual or predicted performance of the entity of interest, and observes correlations between queries, query patterns and performance to facilitate the prediction of future performance of the entity of interest when executed by the data processor.

15. A performance prediction service as in claim 13, where said computer program further returns, in response to receiving a meta-query from the user, information that is descriptive of previously submitted queries about the entity of interest when executed by the data processor.

16. A performance prediction service as in claim 13, where said computer program further returns, in response to receiving a meta-query from the user, edited information that is descriptive of previously submitted queries about the entity of interest when executed by the data processor.

17. A performance prediction service as in claim 13, where said computer program further returns, in response to receiving a meta-query from the user, copies of previously submitted queries about the entity of interest when executed by the data processor.

18. A performance prediction system, comprising:
at least one memory storing a plurality of computer program components, the computer program components further comprising:
a query component for receiving performance queries from users, where the performance queries seek performance prediction data concerning entities of interest; for collecting the performance prediction data and for providing the performance prediction data to users through a communications interface;
a source of performance prediction data, the source coupled to the query component;
a data gathering component for deriving query-relevant data from submitted performance queries and for storing the query-relevant data in a
submitted query database, where at least part of the query-relevant data is derived from information contained in the submitted performance queries;
a meta-query component coupled to the submitted query database for receiving meta-queries from users seeking enhanced performance prediction data; for accessing the query-relevant data to produce enhanced performance prediction information derived from query-relevant information, and for providing the enhanced performance prediction data to users through a communications interface; and
at least one data processor to execute the components of the computer program.

19. The system as in claim 18, wherein the enhanced performance prediction information comprises filtered query-relevant information.

20. A computer program product comprising a computer readable storage device storing a computer readable program, the computer readable program configured to provide performance prediction information when executed by a data processor, wherein operations are performed when the computer readable program is executed bathe data processor, the operations comprising:
receiving performance queries from users regarding at least one entity of interest,
wherein the performance queries seek data relevant to the probability that a
future transaction with the entity of interest will be successful;
using knowledge acquired when responding to previously submitted performance queries which sought data relevant to the probability that a transaction with the entity of interest would be successful to make predictions concerning the future performance of the entity of interest;
saving the predictions; and
providing the predictions to users submitting meta-queries, the predictions provided through a communications interface.

21. A computer program product as in claim 20, wherein the operations further comprise analyzing query patterns and at least one of an actual or predicted performance of the entity of interest, and observing correlations between queries, query patterns and performance to facilitate the prediction of future performance of the entity of interest.

22. A computer program product as in claim 20, wherein the operations further comprise returning, in response to receiving a meta-query from a user, information that is descriptive of previously submitted queries about the entity of interest.

23. A computer program product as in claim 20, wherein the operations further comprise returning, in response to receiving a meta-query from a user, edited information that is descriptive of previously submitted queries about the entity of interest.

24. A computer program product as in claim 20, wherein the operations further comprise returning, in response to receiving a meta-query from a user, copies of previously submitted queries about the entity of interest.

25. The computer program product as in claim 20, wherein the operations further comprise collecting query-relevant data comprising at least one of time, date, location, and identity.

26. The computer program product as in claim 25, wherein the operations further comprise filtering the enhanced performance prediction information to remove at least some of the collected query-relevant data.

27. The computer program product as in claim 20, wherein the operations further comprise registering for automatically querying the acquired knowledge.

28. The computer program product as in claim 27, where automatic querying is initiated upon the occurrence of at least one specified criterion.

29. A computer program product comprising a computer readable storage device storing a computer readable program, the computer readable program configured to perform operations when executed by a data processor, the operations comprising: receiving performance queries submitted by users for performance prediction information concerning an entity of interest; collecting query-relevant data from the submitted queries; storing the query-relevant data; receiving a meta-query seeking enhanced performance prediction information concerning the entity of interest from a user; and using at least some of the query-relevant data to provide enhanced performance prediction information concerning the entity of interest to the user through a communications interface.

30. A computer-implemented system for producing enhanced performance prediction information, the system comprising: means for receiving submitted performance queries, wherein the queries seek data relevant to a probability that a transaction with an entity of interest will be successful, means for deriving query-relevant data from the submitted queries, where at least part of the query-relevant data is derived from information contained in the submitted queries; memory means for storing query-relevant data;

means for receiving meta queries submitted by users, the meta queries seeking enhanced performance prediction information; and data processor means for producing enhanced performance prediction information that comprises the query-relevant data and for providing the enhanced performance prediction data to users submitting queries, the enhanced performance prediction data provided through a communications interface.

31. A computer-implemented system comprising:
a performance prediction service for receiving performance queries seeking performance prediction information concerning an entity of interest, and for providing performance prediction information in response to the received performance queries; and
a communications device for operation with the performance prediction service, comprising a communications interface configured to submit a meta-query to the performance prediction service and to receive enhanced performance prediction information from the performance prediction service in response to the metaquery.

32. The system of claim 31 where the performance prediction service comprises:
a source of data comprising at least performance prediction data, the data source being coupled to a query component adapted for receiving the meta-query and executing the meta-query;
a data gathering component adapted for collecting query-relevant data for fulfilling meta-queries, and storing the query-relevant data in a submitted query database; and
a meta-query component coupled to the submitted query database adapted for querying the query-relevant data to produce the enhanced performance prediction information in response to the reception of the meta-query from the communications device.

33. A computer program product comprising a computer readable device storing a computer readable program, the computer readable program comprising computer readable program components executable by a data processor, the computer readable program components comprising:
a query component for receiving performance queries submitted by users, where the performance queries seek performance prediction data concerning entities of interest; for collecting the performance prediction data; and for providing the performance prediction data to the users through a communications interface;
a data gathering component for deriving query-relevant data from submitted performance queries and for storing the query-relevant data, where at least part of the query-relevant data is derived from information contained in the submitted performance queries; and
a meta-query component for receiving meta-queries from users seeking enhanced performance prediction data; for accessing the query-relevant data to produce enhanced performance prediction information derived from query-relevant information; and for providing the enhanced performance prediction data to users through a communications interface.

* * * * *